(No Model.)

J. HOLLAND.
FOUNTAIN PEN.

No. 356,123.          Patented Jan. 18, 1887.

Witnesses                           Inventor
                                       John Holland
                         By his Attorney

UNITED STATES PATENT OFFICE.

JOHN HOLLAND, OF CINCINNATI, OHIO.

FOUNTAIN-PEN.

SPECIFICATION forming part of Letters Patent No. 356,123, dated January 18, 1887.

Application filed November 20, 1886. Serial No. 219,430. (No model.)

*To all whom it may concern:*

Be it known that I, JOHN HOLLAND, a citizen of the United States, and a resident of Cincinnati, in the county of Hamilton and State of Ohio, have invented certain new and useful Improvements in Fountain-Pens, of which the following is a specification.

The invention relates to an improvement in fountain-pens, and is an improvement upon the pen for which Letters Patent No. 351,033 were granted to me October 19, 1886. Its object is to insure a free flow of ink at all times and in any quantity desired without liability of blotting. This object I accomplish by the means illustrated in the accompanying drawings, in which—

Figure 1:
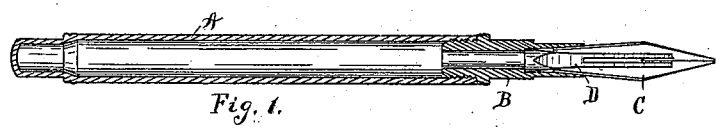
Figure 2:
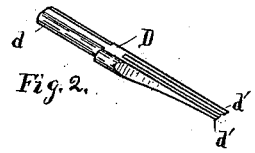
Figure 3:
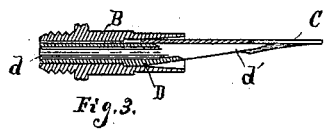

Figure 1 is a longitudinal sectional view of the reservoir, holder, and point-section, with the pen-point and feeder shown in elevation. Fig. 2 is a perspective elevation of the ink-feeder detached. Fig. 3 is a central longitudinal section of the point-section, pen-point, and feeder fitted for use, this section being at right angles to the view shown in Fig. 1.

The handle A, point-section B, and writing-pen C are of ordinary construction. The feeder D, Fig. 2, is composed of a tubular part, $d$, turned to fit into the point section, and two prongs or fingers, $d'$ $d'$, made by slitting the forward part of the piece back to the bore in the tubular part $d$. The tubular part $d$ and top of the fingers $d'$ $d'$ are substantially in the same plane and slightly flattened to conform to the inside of the pen C. The opposite side is tapered to the point, and the sides are also tapered to form light fingers, which rest against the under side of the pen C, upon each side of the split in the pen. The air pressing upon the fluid, passing down to the pen between the fingers, insures a perfect flow at all times, and the pumping action which takes place when the non-slotted feeder is used is thus avoided, as a vacuum is impossible.

It is preferable to make the part $d$ tubular, as shown; but the feeder will work well with the slot which separates the fingers carried back to the inner end of part $d$ upon the side of the tube adjacent to the pen.

What I claim as new is—

1. A feeder for fountain-pens, substantially as hereinbefore set forth, consisting of the tubular shank $d$ and the fingers $d'$ $d'$, the bore of said shank communicating with the space between the fingers.

2. In a fountain-pen, the combination of the handle A, point-section B, and pen C, with the feeder D, said feeder having a shank, $d$, to enter the point-section, and fingers $d'$ $d'$ to bear upon the pen, substantially as specified.

JOHN HOLLAND.

Attest:
GEO. J. MURRAY,
C. W. MILES.